United States Patent
Lund

(10) Patent No.: US 10,428,803 B2
(45) Date of Patent: Oct. 1, 2019

(54) METHOD TO DETERMINE A DRY-OUT PERIOD OF A CONVERTER OF A WIND TURBINE

(71) Applicant: Siemens Aktiengesellschaft, München (DE)

(72) Inventor: Mogens Lund, Videbaek (DK)

(73) Assignee: SIEMENS AKTIENGESELLSCHAFT (DE)

(*) Notice: Subject to any disclaimer, the term of this patent is extended or adjusted under 35 U.S.C. 154(b) by 281 days.

(21) Appl. No.: 15/405,622

(22) Filed: Jan. 13, 2017

(65) Prior Publication Data

US 2017/0298908 A1    Oct. 19, 2017

(30) Foreign Application Priority Data

Apr. 18, 2016   (EP) .................................... 16165806

(51) Int. Cl.
*F03D 17/00*   (2016.01)
*F03D 80/60*   (2016.01)

(52) U.S. Cl.
CPC .............. *F03D 80/60* (2016.05); *F03D 17/00* (2016.05); *F05B 2260/64* (2013.01); *F05B 2270/323* (2013.01); *Y02E 10/72* (2013.01)

(58) Field of Classification Search
None
See application file for complete search history.

(56) References Cited

U.S. PATENT DOCUMENTS

| | | | | |
|---|---|---|---|---|
| 7,837,126 B2 * | 11/2010 | Gao | ........................ | F03D 80/60 236/44 C |
| 7,895,847 B2 * | 3/2011 | Larsen | ...................... | F03D 7/02 62/93 |
| 8,390,140 B2 * | 3/2013 | Bolln | ...................... | F03D 7/026 290/44 |
| 8,909,477 B2 * | 12/2014 | Schietke | ................. | F03D 7/026 290/44 |
| 8,941,257 B2 * | 1/2015 | Iwata | ........................ | H02P 9/02 290/55 |
| 9,351,342 B2 * | 5/2016 | Andrae | .................... | H02J 3/383 |
| 9,621,088 B2 * | 4/2017 | Niemoeller | ............... | H02P 9/08 |

(Continued)

FOREIGN PATENT DOCUMENTS

| | | |
|---|---|---|
| CN | 1531626 A | 9/2004 |
| CN | 101627707 A | 1/2010 |

(Continued)

OTHER PUBLICATIONS

European Search Report for EP Application No. 16165806.7, dated Nov. 3, 2016.

*Primary Examiner* — Justin D Seabe
*Assistant Examiner* — Jason A Fountain
(74) *Attorney, Agent, or Firm* — Schmeiser, Olsen & Watts, LLP

(57) ABSTRACT

A method to determine a dry-out period of a converter of a wind turbine is provided. A time dependent chronology of data is measured in the converter. The measured data-chronology reflects the actual humidity and the humidity-history in the converter cabinet. The measured data-chronology is used to determine a dry-out period of time, which is needed to reduce the humidity inside the converter below a given value by circulating heat inside the converter.

6 Claims, 3 Drawing Sheets

(56) References Cited

U.S. PATENT DOCUMENTS

| | | | |
|---|---|---|---|
| 9,752,923 B2* | 9/2017 | Izumo | G01D 9/00 |
| 10,055,781 B2* | 8/2018 | Schmitz | G06Q 30/0635 |
| 2003/0034443 A1* | 2/2003 | Kouznetsov | D06F 58/28 |
| | | | 250/222.2 |
| 2004/0178638 A1 | 9/2004 | Wobben | |
| 2006/0137214 A1* | 6/2006 | Achenbach | H05K 5/0213 |
| | | | 34/468 |
| 2010/0253079 A1* | 10/2010 | Bolln | F03D 7/026 |
| | | | 290/44 |
| 2012/0104758 A1* | 5/2012 | Schietke | F03D 7/026 |
| | | | 290/44 |
| 2014/0166635 A1* | 6/2014 | Andrae | H02J 3/383 |
| | | | 219/209 |
| 2015/0023792 A1* | 1/2015 | Spitzner | F03D 80/40 |
| | | | 416/1 |
| 2015/0244297 A1* | 8/2015 | Niemoeller | H02P 9/08 |
| | | | 290/44 |

FOREIGN PATENT DOCUMENTS

| | | |
|---|---|---|
| WO | WO 2004-029450 A1 | 4/2004 |
| WO | WO 2008-092449 A2 | 8/2008 |

\* cited by examiner

METHOD TO DETERMINE A DRY-OUT PERIOD OF A CONVERTER OF A WIND TURBINE

CROSS-REFERENCE TO RELATED APPLICATIONS

This application claims priority to European application No. EP 16165806.7, having a filing date of Apr. 18, 2016, the entire contents of which are hereby incorporated by reference.

FIELD OF TECHNOLOGY

The following relates to a method to determine a dry-out period of a converter of a wind turbine.

BACKGROUND

Components of a wind turbine are controlled in their temperature to avoid the accumulation of moisture or humidity in the components.

Auxiliary power might be used to heat up respective components. Auxiliary power might be supplied by a Diesel-generator or by an electrical power grid, being connected with the wind turbine.

In specific situations the heating of the respective components might fail, e.g. the auxiliary power supply by the Diesel-generator might get lost due to a malfunction or the power supply by the electrical power grid might get lost due to grid disturbances.

Especially the power electronics of the converter of the wind turbine needs to be protected from any accumulation of humidity inside the converter and its power electronics.

It is known to heat the converter in critical situations (as described above) by using a fluid, which is part of a cooling system of the converter. The fluid might be water, circulated by a pump, and/or air, circulated by a fan.

The fluid is heated and circulated inside the converter for a pre-determined time period to ensure that no humidity is accumulated in the converter.

As soon as this time period is reached the power electronics of the converter can be activated and the wind turbine could be turned into operational mode next.

The pre-determined time period is known as "dry-out"-period of the converter.

The dry-out process as described above is started and controlled by installation instructions. It ensures that the converter is only started if the power electronics of the converter are dried out completely.

The duration of the respective dry-out period is chosen traditionally and based on experiences gathered in the past. Thus the duration is maximized to result in a guaranteed secure operation of the converter. Thus the chosen dry-out period results in a respective and non-optimized waiting time.

For example the dry-out period, which needs to be kept before a wind turbine is started for the first time or which needs to be kept if the wind turbine was disconnected from auxiliary power for one week, might be fixed with 24 hours, needed for heating and for the circulation of the fluid inside the converter.

SUMMARY

An aspect relate to providing an improved determination of the dry-out period of a converter of a wind turbine.

According to the method invented respective humidity-relevant data are measured in the converter and in dependency of time.

Thus a chronology of data is gathered and acquired.

The data acquired are directly or indirectly representative for the humidity in the converter cabinet.

The data acquired are directly or indirectly representative for the time-dependent history of the increase or decrease of the humidity.

Based on this data-chronology, which reflects the actual humidity and its history, the dry-out period is determined.

During the determined dry-out period heat (i.e. a heated fluid like air or water or even heat, which is provided by electrical power) is circulated inside the converter. At the end of the dry-out period the humidity inside the converter and its cabinet is reduced below a given humidity value.

In a preferred configuration at least humidity-data are measured to form part of the data-chronology, while even temperature-data might be measured to form an additional part of the data-chronology.

The data-chronology could be measured by a sensor, which is placed in the converter or in the respective converter cabinet.

In a preferred configuration a data logger is used to store the data-chronology. Thus the data and the data-history are secured for the history-based determination of the optimized dry-out period.

In a preferred configuration the data logger is power by a battery. Thus the data gathered are secured for the determination of the dry-out period even in case of a complete energy supply failure inside the wind turbine.

In a preferred configuration the stored data are processed and used for calculating the exact needed dry-out period when the control system of the wind turbine is powered up.

After this power-up the control system will use the logged data to calculate the needed dry-out time, activate the dry out next and finally—when the needed dry-out is performed—bring the wind turbine back to operation.

The method invented reduces the dry-out period to an optimized value thus the start up of the converter and of the respective wind turbine is accelerated.

Thus the dry-out period might be avoided in best case or the dry-out period at least might be minimized.

BRIEF DESCRIPTION

Some of the embodiments will be described in detail, with reference to the following figures, wherein like designations denote like members, wherein.

DETAILED DESCRIPTION

Figure 1:
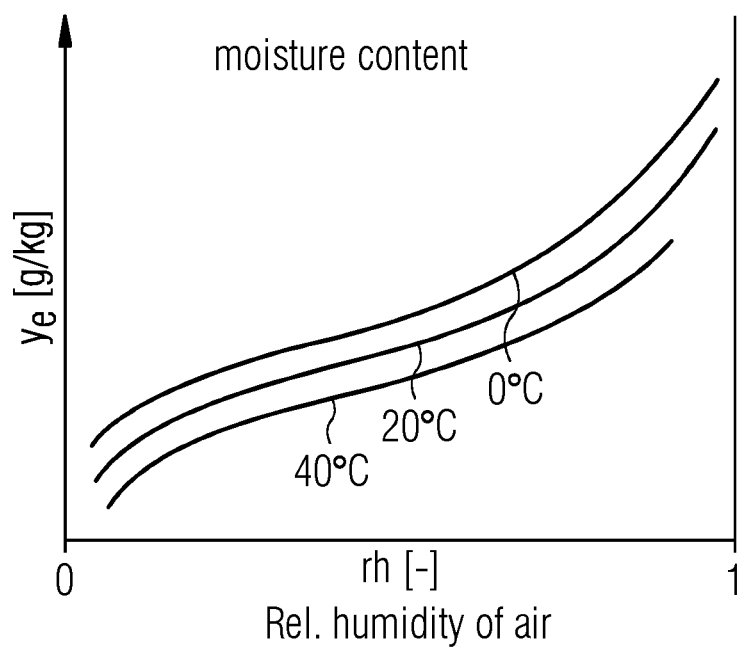
FIG. 1 shows a content of moisture in dependency of a relative air humidity

FIG. 1 shows a content of moisture $y_e[g/kg]$ in dependency of a relative air humidity $rh[-]$.

The content of moisture $y_e$[g/kg] is plotted along the vertical axis while the relative air humidity rh[−] is plotted along the horizontal axis of FIG. 1.

The curves, which are shown for three temperatures 40° C., 20° C. and 0° C., are known as so called "Equilibrium Moisture Content, EMC"-curves for a given material.

Figure 2:
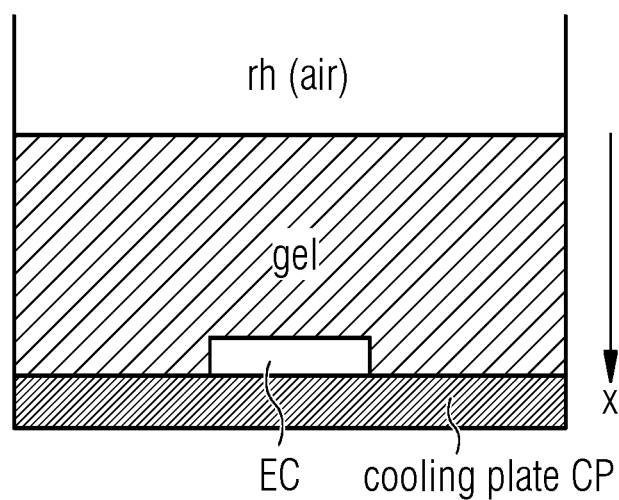
FIG. 2 shows a layer structure in reference to FIG. 1.

In reference to FIG. 2 this material might be a gel and is abbreviated in FIG. 2 as "gel" accordingly. In example this gel might be used to cover and protect IGBT-elements, which are central parts of any wind turbine converter.

FIG. 2 shows in a very principle sketch different layers of material above an electrical component EC.

The thickness of the material is shown in dependency of a parameter x, which could be read as parameter for the material thickness or even as "vertical"-oriented direction into the increasing depth of the respective material.

In example the electrical component EC might comprise IGBT-elements, which are central parts of any wind turbine converter (IGBT is an abbreviation of "Insulated-Gate Bipolar Transistor").

The electrical component EC is arranged in contact with a cooling plate CP. The electrical component EC is even in contact with and covered and protected by the gel as described in FIG. 1.

The gel-layer is exposed to air on its top, which shows a relative air humidity rh(air) at a given depth x.

Along the x-direction the depth of the gel increases steadily.

Figure 3:
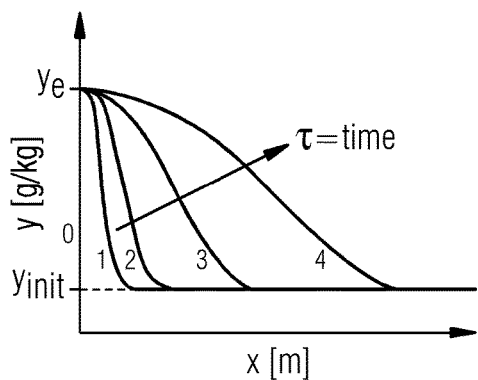
FIG. 3 shows a content of moisture in a gel-material in reference to FIG. 1 and FIG. 2.

Based on FIG. 1 and on FIG. 2 reference is now made to FIG. 3.

FIG. 3 shows the content of moisture y[g/kg] in the gel in dependency of a respective depth x[m], referring to FIG. 1 and to FIG. 2.

The content of moisture y[g/kg] is plotted along the vertical axis while the depth x[m] is plotted along the horizontal axis of FIG. 3.

FIG. 3 reflects a dry gel-material, which is exposed to a humid atmosphere. Initially the moisture content in the gel-material is $y_{init}$.

After some time, say 1 hour, the moisture of the humid atmosphere has diffused into the gel material—this is given by curve 1.

In dependency of time τ the moisture diffuses more into the gel-material, which is given by the curve 2, curve 3 and curve 4.

Finally the moisture content into the gel-material will be $y_e$ everywhere, while $y_e$ is even the moisture content at the boundary line between air and gel.

Thus the parameter $y_e$ marks an maximum amount of moisture-content in the gel or even an equilibrium of moisture-content in the gel.

It can be seen that the relative humidity y(g/kg) at the boundary line between air and gel is high—this is shown by the joint point of intersection of all three curves.

Summoned up the figures show this principle over time: "the higher the relative humidity in the air, the higher the moisture content in the gel".

This is based on the fact that—for many materials including gel material—the resistance for moisture, flowing into the surface of the material, is small compared to the resistance for the moisture, diffusing inside the material.

The "humidification process" as described above will happen if a respective IGBT-element is not heated or temperature controlled, i.e. if there is no auxiliary power available for this purposes due to an OFF-grid-situation.

Figure 4:
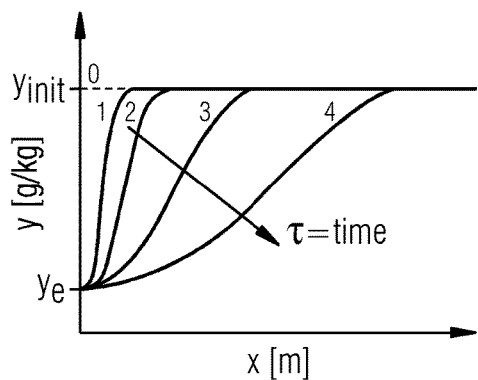
FIG. 4 shows a "de-humidification process" with reference to FIG. 3.

FIG. 4 shows a respective "de-humidification process" in view to the process described in FIG. 3—thus the moisture is dried out now.

FIG. 4 shows the content of moisture y[g/kg] in the gel (vertical axis) in dependency of a respective depth x[m] (horizontal axis), referring to the figures above.

Here the initial moisture content in the gel is denoted by $y_{init}$. The moisture content of the dry air is denoted by $y_e$.

After a respective period of time τ the gel-material will be dried out, ending up with the moisture content $y_e$ inside the whole gel-material.

This "drying out process" needs to be done whenever an IGBT-element was face with an OFF-grid-time.

Figure 5:
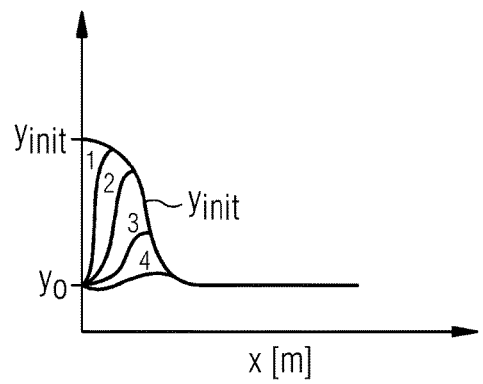
FIG. 5 shows a moisture distribution and its dry-out in reference to the figures above.

FIG. 5 shows a specific case: the dry gel-material is exposed to a humid atmosphere, for example for a time period of one hour, in a first step.

This results in a distribution of moisture content $y_e$ as shown and in dependency of the depth x.

In a second step a dry out of this humidity is initiated. In example after a period of time of approximately four hours the gel material is dried out again.

Figure 6:
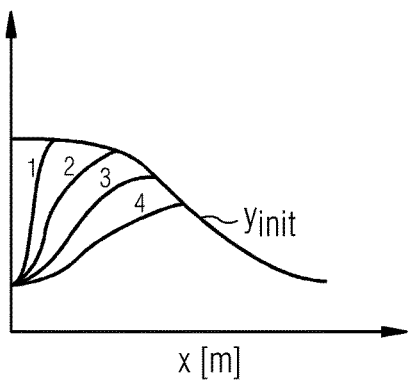
FIG. 6 shows a time dependent variation of the situation as shown in FIG. 5.

FIG. 6 shows a similar case but with these differences: the gel has been exposed to a humid atmosphere for a longer time before the drying-out process is started.

As a consequence the drying-out will take longer time.

In reference to the figures above the curves as shown can be simulated by a model.

Based on this model and based on the gathered data-chronology of the humidity inside the converter a required and optimized dry-out time can be calculated.

The dry put time is needed to reduce the humidity inside the converter below a given value—for example a fluid (like air or water or the like) might be circulated inside the converter for heating purposes.

As a consequence the dry-out time can be reduced in most cases to an optimized time period.

Alternatively (instead of simulation based on a model) the needed dry-out time could be estimated and based on a measured humidity inside the GEL as well.

Figure 7:
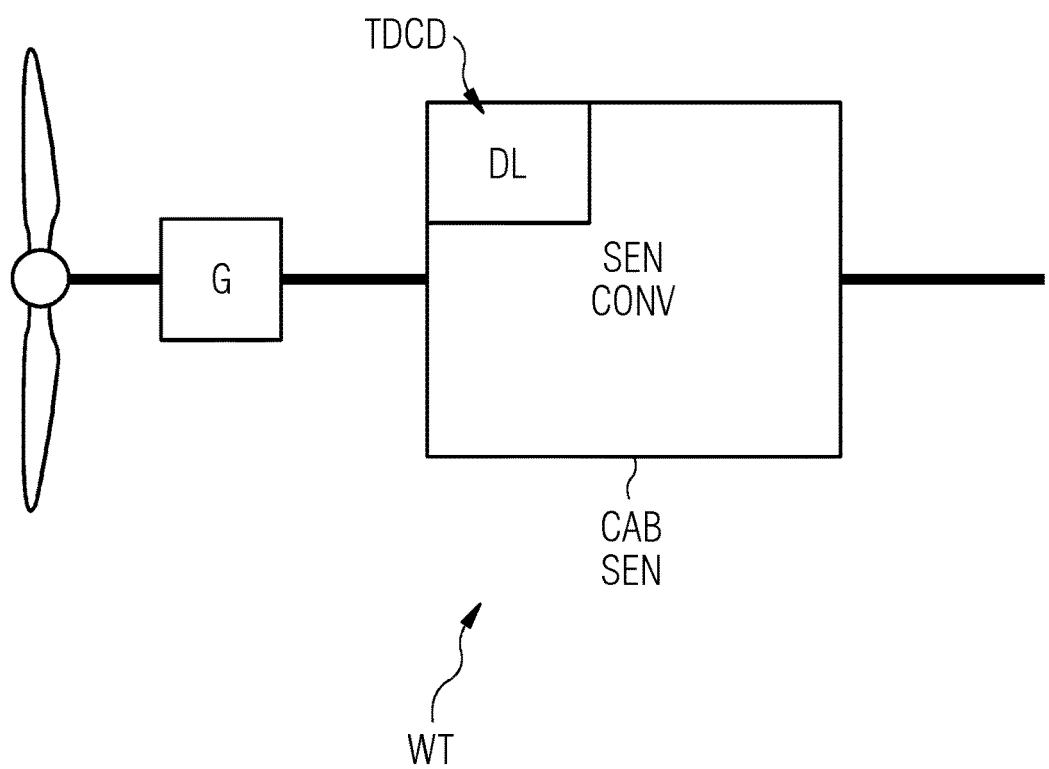
FIG. 7 shows the method invented based on a schematic wind turbine.

FIG. 7 shows the method invented based on a schematic wind turbine.

A number of blades BL of a wind turbine WT is driven by wind and transfers rotational energy to a generator GEN.

The generator GEN transforms the rotational energy into electrical power, which is passed on to a converter CONV.

The converter CONV is arranged into a converter cabinet CAB and converts electrical power with a varying frequency into electrical power with constant frequency.

According to the method invented a time dependent chronology of data TDCD is measured in the converter CONV of the wind turbine WT.

The measured data-chronology TDCD reflects the actual humidity and the humidity-history in the cabinet CAB of the converter CONV.

In a second step S2 the measured data-chronology TDCD is used to determine a dry-out period of time, which is needed to reduce the humidity inside the converter CONV and its respective converter cabinet CAB below a given value.

This could be done by circulating of a heated fluid (air or water) inside the converter. It is even possible to use any other heat (i.e. any direct or indirect heating, electrical power-based heating, or the like).

The data-chronology of the humidity is measured by a sensor SEN, which is placed in the converter CONV or in the respective converter cabinet CAB.

The data-chronology is stored in a data-logger DL, which might be power by a battery.

The stored data TDCD are processed and used for calculating the dry-out period.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method to determine a dry-out period of a converter of a wind turbine, comprising:
   measuring a time dependent chronology of data in the converter, wherein the time dependent chronology of data reflects an actual humidity and a humidity-history in a converter cabinet; and
   determining a dry-out period of time using the time dependent chronology of data measured prior to operation of the wind turbine, which is needed to reduce a humidity inside the converter below a given value by circulating heat inside the converter.

2. The method according to claim 1, wherein temperature-data are measured to form an additional part of the time dependent chronology of data.

3. The method according to claim 1, wherein the time dependent chronology of data is measured by a sensor, which is placed at or in the converter or in the converter cabinet.

4. The method according to claim 1, wherein a data logger is used to store the time dependent chronology of data.

5. The method according to claim 4, wherein the data logger is powered by a battery.

6. The method according to claim 1, wherein the time dependent chronology of data is processed for calculating the dry-out period.

* * * * *